United States Patent Office 3,356,391
Patented Dec. 5, 1967

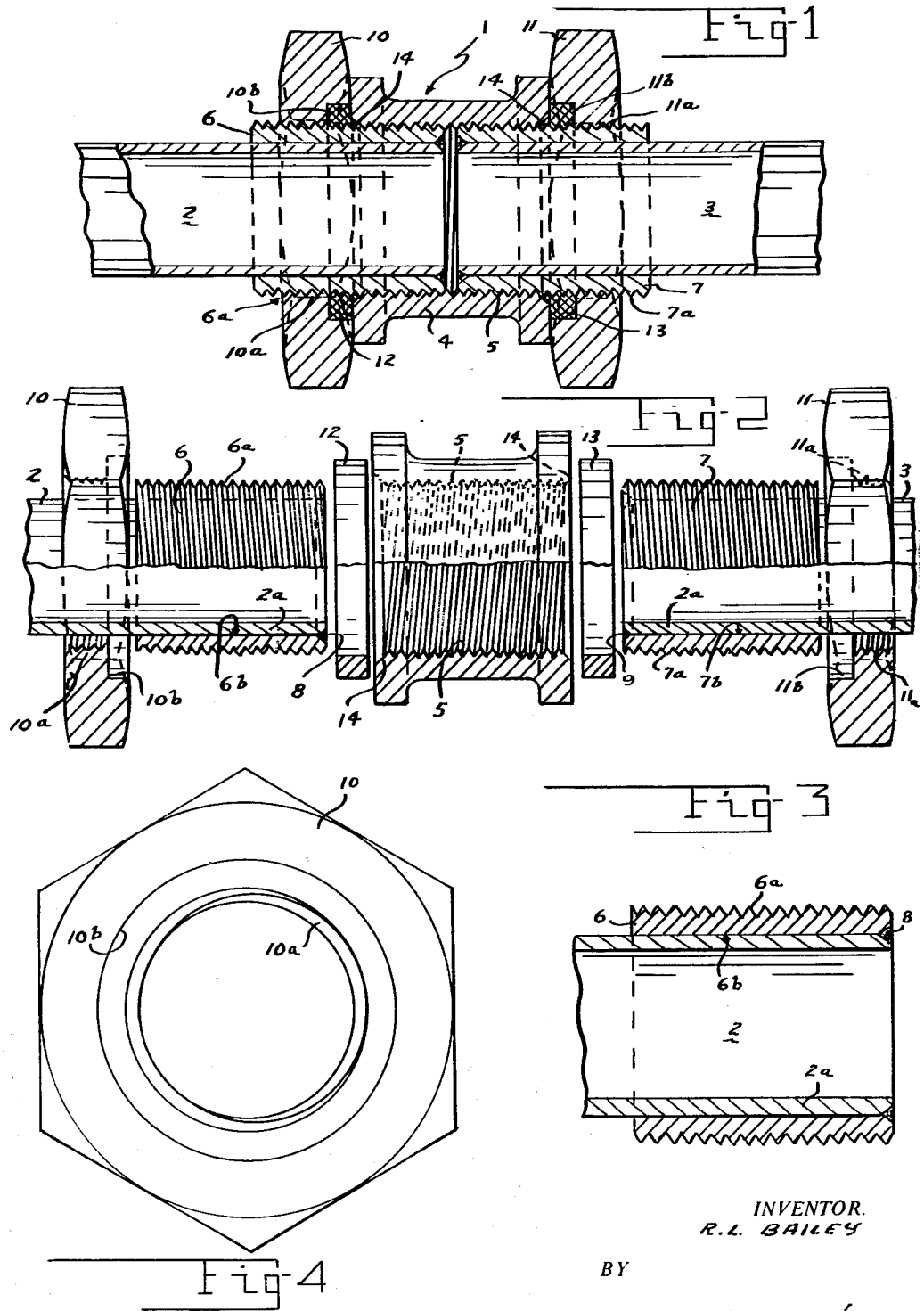

3,356,391
PIPE OR TUBE COUPLING DEVICE
Richard L. Bailey, Van Nuys, Calif., assignor, by mesne assignments, to the United States of America as represented by the Secretary of the Air Force
Filed Jan. 10, 1967, Ser. No. 608,950
2 Claims. (Cl. 285—89)

ABSTRACT OF THE DISCLOSURE

A pipe or tube coupling for coupling two tubes or pipes together in aligned spaced relation including two externally similarly threaded sleeves fitted over the adjacent ends of the pipes in sealed relation, with an end to end internally threaded coupling member receiving the threaded sleeves in the opposite ends thereof and jam nuts on the threaded sleeves torqued toward the coupling member with an annular packing ring between each of the nuts and the ends of the coupling member, preventing leakage.

---

This invention relates to pipe or tube coupling devices, having for an object the provision of a tube or conduit coupling device for connecting fluid lines without threading the ends thereof in which the sealing faces are isolated from separation forces caused by pressure and temperature changes.

A further object is the provision of a coupling device for coupling the ends of two tubes or pipes in aligned spaced relation to each other in which the end to end spaced relation between the adjacent ends of the tubes can be varied without affecting the coupling relation between the coupling means and the tubes.

A further object of the invention is the provision of a threaded coupling device for coupling the unthreaded extremities of the tubes or pipes together in fluid-tight sealed relation without disturbing the axial spaced relation between the tube extremities during the coupling and sealing operations thereof.

A further object is the provision of a threaded coupling device including threaded sleeves telescopically receiving the unthreaded extremities of the tubes in fluid-tight retained relation and an internally threaded coupling union for threadably receiving the threaded sleeves in the opposite ends thereof, in which the pitch and direction of the threads in the coupling union and on the threaded sleeves are identical.

A further object includes clamping nuts threadably mounted on the sleeves and rotatably in relatively opposite directions on the threads against the ends of the coupling union to provide a fluid-tight seal between the opposite ends of the coupling union, the nuts, and the threaded sleeves.

A further object is the provision of a coupling device in which the sleeves are exteriorly threaded to be received in the threaded interior of the coupling union and are formed with internal bores to snugly receive the unthreaded extremities of the tubes or pipes with the outer extremities of the tubes welded completely around the adjacent ends of the sleeves to prevent leakage between the sleeves and the tubes and resist axial movement therebetween.

A further object is the provision of a deformable sealing ring surrounding each sleeve intermediate the ends of the coupling union and the nuts, in which the sealing rings are deformable by opposite rotation of the nuts on the threaded sleeves at opposite ends of the coupling union, and includes annular concentric channels formed in the nuts adjacent the ends of the coupling union for partially receiving and confining radial outward deformation of the sealing rings by contact thereof with the ends of the coupling union.

Other objects and advantages of the invention will become apparent from the following description and accompanying drawings in which like reference characters refer to like parts in the several figures.

Drawing

FIGURE 1 is a longitudinal sectional view through a coupling device incorporating the invention, illustrating the coupling operation completed to provide a leak-tight connection between two aligned pipes having unthreaded adjacent ends.

FIGURE 2 is a longitudinal quarter section view illustrating the parts of the coupling device in separated relation with the pipes or tubes which are to be coupled telescoped and secured in the threaded receiving sleeves.

FIGURE 3 is an enlarged detail longitudinal sectional view through one of the threaded sleeves of the coupling device more clearly illustrating the annular weld between the outer end of the pipe or tube which is telescoped in the threaded sleeve and the end of the threaded sleeve.

FIGURE 4 is an enlarged plan view of one of the clamping or sealing nuts, showing the annular groove therein for partially receiving and confining the deformable sealing ring or gasket against radial outward movement during tightening of the nut to cause the sealing deformation of the ring between the coupling union, the exterior of the threaded sleeve, and the clamping nut.

Referring more particularly to FIG. 1, the reference numeral 1 denotes generally the pipe or conduit coupling device for connecting similar pipes, preferably metallic conduits in end to end aligned relation, in which the pipes or conduits are indicated at 2 and 3.

The coupling device 1 comprises a central internally threaded coupling union 4 which is threaded throughout its length as indicated at 5. As shown, the threads are right-hand pitch.

A pair of exteriorly threaded sleeves are provided, indicated generally at 6 and 7, having identical complemental threads 6a and 7a to the internal threads 5 in the union 4. In this construction these threads 6a and 7a on the exterior of both the sleeves are right-hand pitch.

The externally threaded sleeves 6 and 7 are formed with similar concentric bores 6b and 7b snugly receiving the unthreaded extremities 2a and 3a of the conduits or pipes 2 and 3. The extremities 2a and 3a of the pipes or tubes 2 and 3 are telescoped in the smooth bores 6b and 7b of the externally similar threaded sleeves 6 and 7 with the ends of the tubes 2 and 3 preferably flush with the ends of the respective sleeves as shown.

The respective adjacent ends of the tubes and sleeves 2 and 6, and 3 and 7 are secured together as shown by an annular welds 8 and 9.

A pair of clamping nuts 10 and 11 are provided which are internally threaded at 10a and 11a for threaded engagement with the identical threads 6a and 7a on the sleeves 6 and 7. As shown these threads are also right-hand pitch.

The nuts 10 and 11 are each formed with an annular packing ring or gland receiving channel or groove 10b and 11b for receiving an annular deformable packing ring 12 and 13.

The packing rings 12 and 13 are preferably made of deformable metallic material, such as lead, copper, and the like, although they may be formed of deformable plastic, such as "Teflon" and the like, having an inner diameter for receiving the threaded extremities of the sleeves 6 and 7 therethrough and an external diameter adapted to be snugly received in the groove 10b, or channel, and resist radial outward deformation of the rings 12, 13 while seated in the grooves 10b and 11b substantially as shown.

As shown, the packing rings 12 and 13 are rectangular in cross section, having a thickness somewhat exceeding the depths of the annular channels or grooves 10b and 11b in the clamping nuts 10 and 11. If desired the packing rings might be made with internal threads (not shown) so as to be threaded on the threads 6a or 7a on the sleeves 6 or 7. Also, the opposite ends of the threaded bore 5 in the coupling union 4 may be slightly chamfered as indicated at 14.

In assembling the coupling device 1 the unthreaded ends of the conduits or pipes 2 and 3 are inserted in the threaded sleeves 6 and 7 and the outer end of each pipe or tube is welded, as indicated at 8 and 9, to the end of the respective surrounding sleeve. The nuts 10 and 11 are then screwed over the threads of the sleeves, as seen in FIG. 2.

The deformable packing rings are next placed over the threaded sleeves, for instance next to the nuts. The coupling union 4 is then threaded completely (or almost completely) onto one or the other of the sleeves. The other conduit or pipe (with the nut and packing ring on the sleeve on that pipe) is placed in axial alignment with the first conduit with the adjacent ends in the desired spaced (or contacting) relation as seen in FIG. 1.

The coupling union 4 is then partially backed off the sleeve, for instance the sleeve 7, and onto the other sleeve 6 to dispose the adjacent ends of the pipes 2 and 3 about midway between the ends of the coupling union 4.

The two clamping nuts 10 and 11 are now rotated in opposite directions on the threads on the sleeves to engage and receive the clamping rings 12 and 13 in their respective grooves 10b and 11b and force the same against the adjacent ends of the coupling union 4. Continued tightening of the clamping nuts 10 and 11 deforms the rings 12 and 13 into sealing relation with the interior surfaces of the grooves, the ends of the coupling union 4, and the external threads 6a and 7a on the sleeves 6 and 7, this providing a tight and efficient seal between the two unthreaded ends of the pipes or conduits 2 and 3 without disturbing the axial alignment or longitudinal displacement between the two conduits 2 and 3 being coupled or connected together.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention as defined in the accompanying claims.

I claim:

1. A pipe couplying device for connecting the end portions of similar unthreaded uniform diameter pipe sections together in end to end aligned relation comprising a pair of identical diameter identically threaded elongated sleeve members each having a concentric cylindrical bore for telescopically receiving and means fixing the outer end portion of each one of the pipe sections snugly therein in fluid tight relation and against relative axial movement, said sleeve members each having identical external threads thereon with identical pitch directions from end to end thereof, a clamping nut threadably mounted on each of said sleeve members for rotative displacement axially along said sleeve members, an elongated cylindrical coupling having a continuous internal thread therein from end to end, complementary in size pitch and direction to the external threads on said elongated sleeve members to threadably receive either of said sleeve members therethrough, and an annular deformable packing ring surrounding each of said elongated sleeve members disposed between each clamping nut and one end of said coupling, said deformable packing ring having an internal diameter to closely receive the sleeve member therethrough, whereby when said sleeve members with said pipe end portions therein are screwed into the opposite ends of said coupling and said clamping nuts are rotated in opposite directions on said sleeve members toward the ends of said coupling to clamp, compress, and deform said deformable packing rings into fluid sealing relation between ends of the coupling, the clamping nuts, and the threads on the threaded sleeve members, to provide a fluid tight connection between the pipe sections.

2. Means for connecting a pair of similar uniform diameter fluid conducts together in aligned spaced end to end relation comprising, a pair of identical externally threaded elongated sleeve members, each having a smooth uniform cylindrical bore therethrough snugly receiving the end portion of one of the spaced end to end tubular conduits therein with the outer ends thereof in flush relation, annular fluid sealing and securing means between the flush ends of each conduit and surrounding sleeve to prevent fluid leakage and axial movement therebetween, a pair of identical internally threaded clamping nuts each threaded on one of the sleeve members for rotation in opposite directions for movement toward each other, each clamping nut having an annular concentric packing ring receiving channel in the surface thereof, facing toward the other clamping nut, and opening radially inward through the internal threads thereof to the external threads on the sleeve member therein, each channel having an annular concentric abutment surface, to resist outward radial deformation of a deformable packing ring when seated channel, an annular deformable packing ring surrounding each of said threaded sleeve members having an outer periphery snugly seated in each channel against said abutment surface having a thickness sufficiently greater than the depth of the channel inwardly from the surface of the clamping nut, to deform radially inward into fluid sealing engagement with the external threads of the sleeve members therein when said packing ring is compressed in said channel into flush relation with the surface of the clamping nut, and an elongated cylindrical coupling member having opposite parallel ends disposed for impingement by said packing rings and a continuous internal uniform thread therethrough from end to end, substantially identical in diameter, pitch and direction to said identical external threads on the threaded sleeve members, rotatable in one direction to be completely threaded onto one of said pair of threaded sleeve members when secured on the adjacent ends of a pair of axially spaced end to end conduits while the other conduit is temporarily displaced laterally, and the coupling rotated in the opposite direction to be threadably received on said other sleeve member after said other conduit and sleeve member thereon is returned back into spaced axial alignment, without disturbing the axially spaced relation between the ends of the threaded sleeve members, whereby rotation of the two clamping nuts in opposite directions on the sleeve member toward the end surfaces of the coupling member impinges, compresses and deforms the packing rings radially inward into fluid sealing engagement with the external threads on the sleeve members to form a fluid sealed coupling between the end to end spaced tubular sleeve members and the conduits when secured therein, without disturbing the end to end spaced relation thereof.

References Cited

UNITED STATES PATENTS

| 1,093,435 | 4/1914 | Killebrew | 285—355 |
| 1,982,850 | 12/1934 | Banks | 285—286 |
| 2,343,235 | 2/1944 | Bashark | 285—89 |
| 3,180,659 | 4/1965 | Vigneron | 285—89 |

FOREIGN PATENTS 813,598   5/1959   Great Britain.

CARL W. TOMLIN, *Primary Examiner.*

W. L. SHEDD, *Assistant Examiner.*